United States Patent [19]

Boll et al.

[11] Patent Number: 4,971,159

[45] Date of Patent: Nov. 20, 1990

[54] MICROPOSITIONER

[75] Inventors: Gregory G. Boll, Watchung; Harry J. Boll, Berkeley Heights, both of N.J.

[73] Assignee: G. G. B. Industries, Inc., Naples, Fla.

[21] Appl. No.: 180,477

[22] Filed: Apr. 12, 1988

[51] Int. Cl.[5] .................. F16M 11/42; G05B 11/48

[52] U.S. Cl. .................. 173/171; 173/91

[58] Field of Search .................. 173/91, 171, 31, 101, 173/116; 33/613, 568, 573; 74/128, 479; 350/531

[56] References Cited

U.S. PATENT DOCUMENTS

| | | | |
|---|---|---|---|
| 2,991,872 | 7/1961 | Keegan | 198/220 |
| 3,517,904 | 6/1970 | Verchain | 248/179 X |
| 3,628,419 | 12/1971 | Doughton | 91/224 |
| 3,743,904 | 7/1973 | Wiesler et al. | 318/162 |
| 4,064,949 | 12/1977 | Chromy | 173/14 |
| 4,160,486 | 7/1979 | Kostylev et al. | 173/91 X |
| 4,193,317 | 3/1980 | Oono et al. | 74/479 |
| 4,409,860 | 10/1983 | Moriyama et al. | 74/479 |
| 4,492,356 | 1/1985 | Taniguchi et al. | 248/346 |
| 4,525,852 | 6/1985 | Rosenberg | 378/34 |
| 4,593,603 | 6/1986 | Johnson | 91/265 |
| 4,690,225 | 9/1987 | Tupitsyn et al. | 173/116 |

OTHER PUBLICATIONS

Economy Micro Positioner.

*Primary Examiner*—Frank T. Yost
*Assistant Examiner*—Rinaldi Rada
*Attorney, Agent, or Firm*—Irwin Ostroff

[57] ABSTRACT

A microposition table is held in place by the friction between a series of plates contacting one another. Movement is effected by forcing a small burst of air through a series of channels to drive metal pistons each held captive inside an elongated cylinder. The impact of each piston striking one or the other of the cylinder ends imparts sharp mechanical impulses to each plate driving the plate a small distance in the direction of the impacting force. Repeated impacts by repeated bursts of air move the plates the desired distances with respect to one another.

21 Claims, 5 Drawing Sheets

10 14 20 26 30 28 22 29 18 16 24 29 12 32

100
156
154
140
142
138
152
158
160
28
146
134
136
162
126
124
132
130
120
118
122
128
116
106
110
114
102
104
108
112

400

28
86
96
78
88
84
90
92
94
74
80
82
76
72a
72

500
508
505
504
506
514
502
516
510
512
28
509

200
214
214b
220
224
217
226
217a
236
234
216b
212
222
219
210
206
208
204
202
AIR PUMP
214a
230
218
216a
213
232
216

MICROPOSITIONER

FIELD OF THE INVENTION

This invention relates to micropositioners and in particular to mechanical apparatus for the precise positioning of a tool such as an electrical test probe or other implement.

BACKGROUND OF THE INVENTION

There exist a wide variety of applications in the field of electronics, robotics, science, engineering and art where an implement of some kind must be positioned with respect to a fiducial point or other reference in a mechanical system. For convenience and definiteness, this specification will be written in terms of a positioner useful for accurately positioning instruments used for the testing of integrated circuits, but it is in no way intended that this invention should be limited to the testing field.

In testing an integrated circuit, it is required to bring an electrically conductive probe near to or in contact with an electrically conductive path of the circuit under test. In modern-day integrated circuits, the electrically conductive parts of integrated circuits are often smaller than one micrometer in extent. Therefore it is required that a test probe must be positioned to an accuracy that is better than one micrometer. Prior art micropositioners either are unable to respond with the required precision or are very expensive to construct and are inconveniently large in physical size, making them difficult to use in many important applications.

Prior art micropositioners have been generally of three forms: the most common form consisting of three precision screws oriented in three directions of motion (up and down, right and left, forward and back) that each drive a precision machined sliding member held captive inside a precision machined groove (e.g., see U.S. Pat. No. 3,517,904, June 30, 1970). Such an apparatus is expensive to construct because of the precision machining required. In addition, the screw must be manipulated by the operator's hand and the force of the hand on the positioner produces random, undesirable movements due to the limited mechanical rigidity of the mounting that holds the positioner. Motorized drivers to adjust the positioning screws can be used to eliminate the hand induced movement but the consequence is an increase in cost and size of the micropositioner.

The joystick style micropositioner available from Signatone Corp., 2687 Enochs Street, Santa Clara, Calif. 95051, although used extensively from 1950 to about 1970, is no longer in common use today because of the limited travel and because the precision is less than required.

A piezoelectric linear driver or inchworm positioner mechanism (e.g.,, see U.S. Pat. No. 4,525,852, June, 1985), although giving good precision of movement, is very expensive to construct and is too easily damaged in normal laboratory or production use.

It is therefore desirable to provide an apparatus that is both relatively inexpensive to construct and provides the precise movement required.

SUMMARY OF THE INVENTION

The present invention is directed to a micropositioner comprising a positioning member which is adapted to be put in contact with an object to be moved. A movement imparting means, which comprises a moveable impact member, is supported by the positioning member. Means for arresting the movement of the impact member is integral to or fixed to the positioning member. Means are included for causing the impact member to strike the arresting means with a preselected force which is transmitted to the positioning member to cause the arresting means and the positioning member to move in the general direction of the force such that the object is moved.

Briefly stated, in a typical embodiment, motion in the micropositioner of this invention is achieved by mechanically tapping or striking a friction held moveable member. In the micropositioner of this invention a hard metal ball or other hard moveable member such as a piston is held captive inside a cylinder. The moveable member is driven back and forth inside the cylinder by forcing air in or out of one side of the cylinder. When the moveable member strikes one or the other of the two ends of the cylinder, it imparts a sharp mechanical impulse to the end of the cylinder. The cylinder is rigidly mounted on a friction held member which then can move as a result of the sharp mechanical impulse. An object to be accurately moved to a desired position typically rests on the friction held member and is moved when the member is moved.

The invention will be better understood from the following more detailed description taken in conjunction with the accompanying drawings.

DETAILED DESCRIPTION

Figure 1:
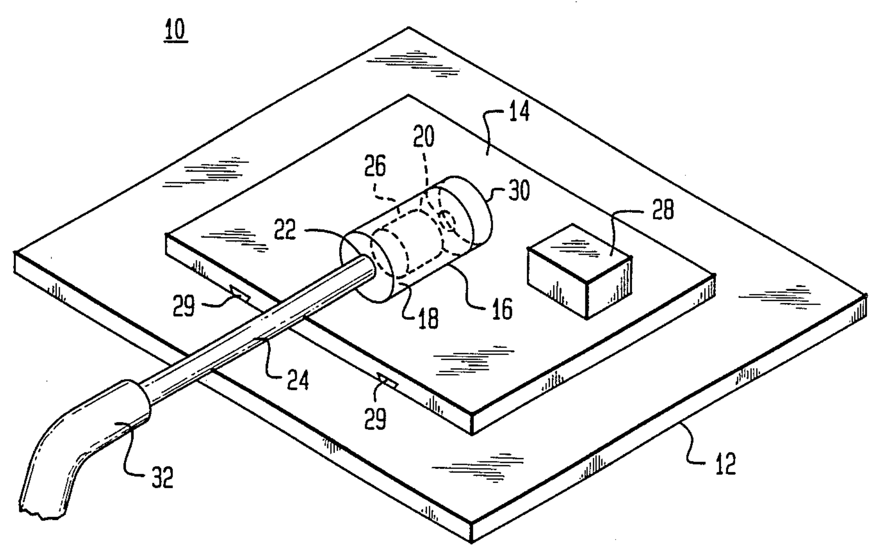
FIG. 1 shows a micropositioner for a single direction of movement in accordance with one embodiment of the invention.

Referring now to FIG. 1, there is shown a micropositioner (positioner) 10 in accordance with an embodiment of this invention which provides for accurate positioning of an object 28 in one direction. Positioner 10 comprises base-plate 12, a plate 14, a cylinder 16, an impacting piston 26 and an air filter 30. Cylinder 16, which is rigidly attached to plate 14, defines a chamber 18 within which resides impacting piston 26 and which has end members having orifices 20 and 22. A rigid tube 24, which is solidly mechanically attached in a sealing relationship with the end of a cylinder 16 which contains orifice 22, communicates with chamber 18 via orifice 22. Air filter 30 is located at the end portion of cylinder 16 which contains orifice 20 and is in communication with chamber 18 via orifice 20. Impacting piston 26 is held captive within chamber 18 and is adapted to slide freely inside the chamber 18 until it strikes either one or the other of the ends of the cylinder 16. A flexible tube 32 is connected in a sealing manner to tube 24 and cArries air from a source shown in FIG. 5 through the flexible tube 32, the metal tube 24, the orifice 22 and drives the piston 26 toward the end of cylinder 16 which contains the orifice 20.

With the impacting piston 26 located near orifice 22, a stream of air is introduced into tube 32. This stream of air passes through tubes 32 and 24, through orifice 22, enters chamber 18 and pushes impacting piston 26 toward the end of cylinder 16 which contains orifice 20. When the impacting piston 26 strikes an end of cylinder 16, it imparts a sharp mechanical impulse to that end of the cylinder 16. That impulse is carried to the plate 14 by virtue of the solid mechanical connection between the cylinder 16 and the plate 14. The sharp mechanical impulse causes plate 14 to slide against its friction with baseplate 12 in the direction of the impulse, thus moving plate 14 a small distance with respect to the fixed baseplate 12. To move another step, a small amount of air is withdrawn from tube 24 to draw the impacting piston 26 backward until there is once more a space between the impacting piston 26 and the cylinder 16 end defining orifice 20. Then another stream of pressurized air is applied down the tube 24 and the impacting piston 26 strikes the end of cylinder 16 that defines orifice 20 a second time. By repeating this action, plate 14 can be accurately moved any desired distance.

To move plate 14 in the opposite direction, air is suddenly removed from tube 24. This causes the impacting piston 26 to strike the end of the cylinder 16 that defines orifice 22. The mechanical impulse created causes plate 14 to move to the left. Again to repeat the action a stream of air introduced through tube 24 causes the impacting piston 26 to move toward the air filter 30. Then the air is suddenly removed to cause the impacting piston 26 to strike the same end of cylinder 16 once again. The air filter 30, limits dust or other matter from entering chamber 18 that could impede the movement of impacting piston 26.

In this way any instrument or object 28, such as a test probe that is mounted on the plate 14, can be moved to any position desired in one direction. By controlling the strength of the air stream, each increment of movement can be made larger or smaller. Dovetail guides 29 or any other guides can be added to ensure movement in just a single direction. The guides can include spring members (not shown) to ensure that plate 14 rides along the guides without mechanical looseness or play. Also the spring members can be adjusted to provide the desired degree of sliding friction between plates 14 and 12.

Other methods of actuating the piston could be employed. Such methods include well known piezoelectric or electromagnetic transducers.

The tubing 24 of FIG. 1 must flex as plate 14 moves. In some applications this may be detrimental because the flexure of tube 14 represents an uncontrolled force on the moving plate 14. In addition, any extraneous movement of tube 24, such as accidentally touching the tube or the vibration generated by a pump and controller that introduce the air movements through tube 24, may cause unwanted small movements of plate 24.

Figure 2:
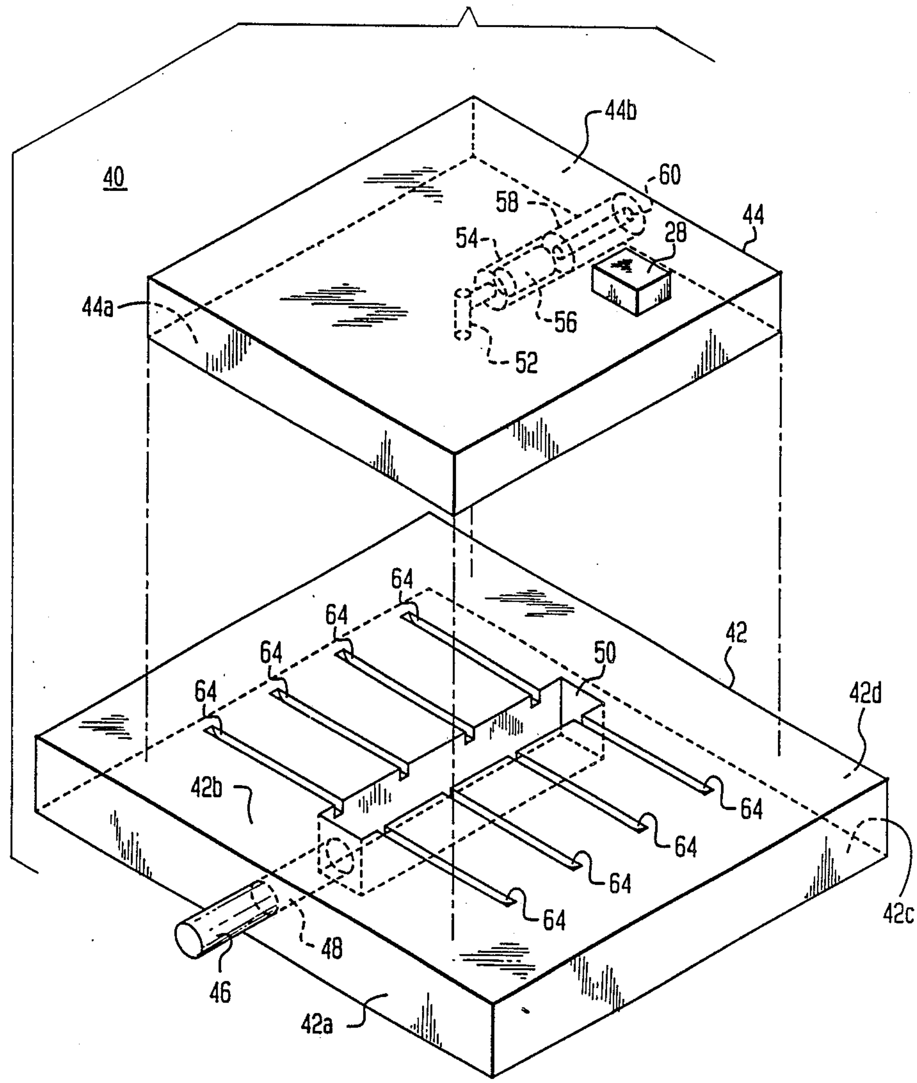
FIG. 2 shows a micropositioner for a single direction of movement in accordance with another embodiment of the invention.

Referring now to FIG. 2, there is shown a micropositioner (positioner) 40 in accordance with another embodiment of this invention which provides for the accurate positioning of a object 28 in one direction. Positioner 40 is similar to positioner 10 of FIG. 1 but it eliminates the need for a flexible tube coupled to a cylinder containing an impacting piston. Positioner 40 comprises base-plate 42 and a plate 44. Plate 42 defines a hole 48 that is formed partway into and from an end 42*a* of plate 42. A tube 46 is set in a sealing relationship with hole 48. Plate 42 also defines a slot 50 which extends part-way through plate 42 and has an end which intersects with hole 48 so that air introduced into tube 46 flows through hole 48 and then into slot 50. Slot 50 extends so as to intersect a top surface 42*b* of plate 42, but does not extend through a bottom surface 42*c* of plate 42 or through end surfaces 42*a* or 42*d* of plate 42.

Plate 44 defines a hole 52 which intersects a bottom surface 44*a* of plate 44 and intersects and communicates with a chamber 54 within plate 44 which has an end which intersects with a side end wall 44*b* of plate 44. An impacting piston 56 exists within chamber 54. After impacting piston 56 is inserted in chamber 54, a plug member 58 is rigidly attached (e.g., by pressure fit or welding) to sidewalls of chamber 54. Plug 58 defines a hole 60 there through which allows chamber 54 to communicate with the air around plate 44. Impacting piston 56, upon being pushed by air entering either end of chamber 54 can slide to and impact against either end of chamber 54.

When plate 44 is placed on top of plate 42, slot 50 is essentially sealed except for where it communicates with slot 50.

The operation of positioner 40 is very similar to the operation of positioner 10 of FIG. 1. A stream of air introduced through tube 46 flows into slot 50 and then through hole 52 and then into one end of the chamber 54. The force of the air pushes the moveable impacting piston 56 until it strikes the plug member 58, thereby imparting a sharp mechanical impulse to the plug member 58 and thence to the plate 44. This drives the plate 44 a small distance toward the right. Naturally, mechanical guides (not shown) to ensure linear motion of member 44 and to hold plate 44 in intimate contact with plate 42 can be used here also as well as a filter over hole 60 to prevent ambient dust from entering the cylinder.

After the moveable plate has been moved to the desired position, friction holds it in place. To increase the friction, a steady vacuum can be applied to the tube 46. This draws the impacting piston 56 to the near side of chamber 54, and if the impacting piston 56 and chamber 54 are properly mated, the impacting piston 56 will seal the entry to hole 52 so air can no longer enter. The resulting vacuum acts on the mating faces of plates 42 and 44 pulling them together very strongly so the friction between them is greatly increased. The effect of the vacuum can be enhanced by cutting shallow grooves 64 into the top surface 42*b* of plate 42 or 44. The grooves 64 should intersect the slot 50, but not the edges of the plates 42 and 44. The grooves 64 could be formed in plate 44 instead of plate 42.

Figure 3:
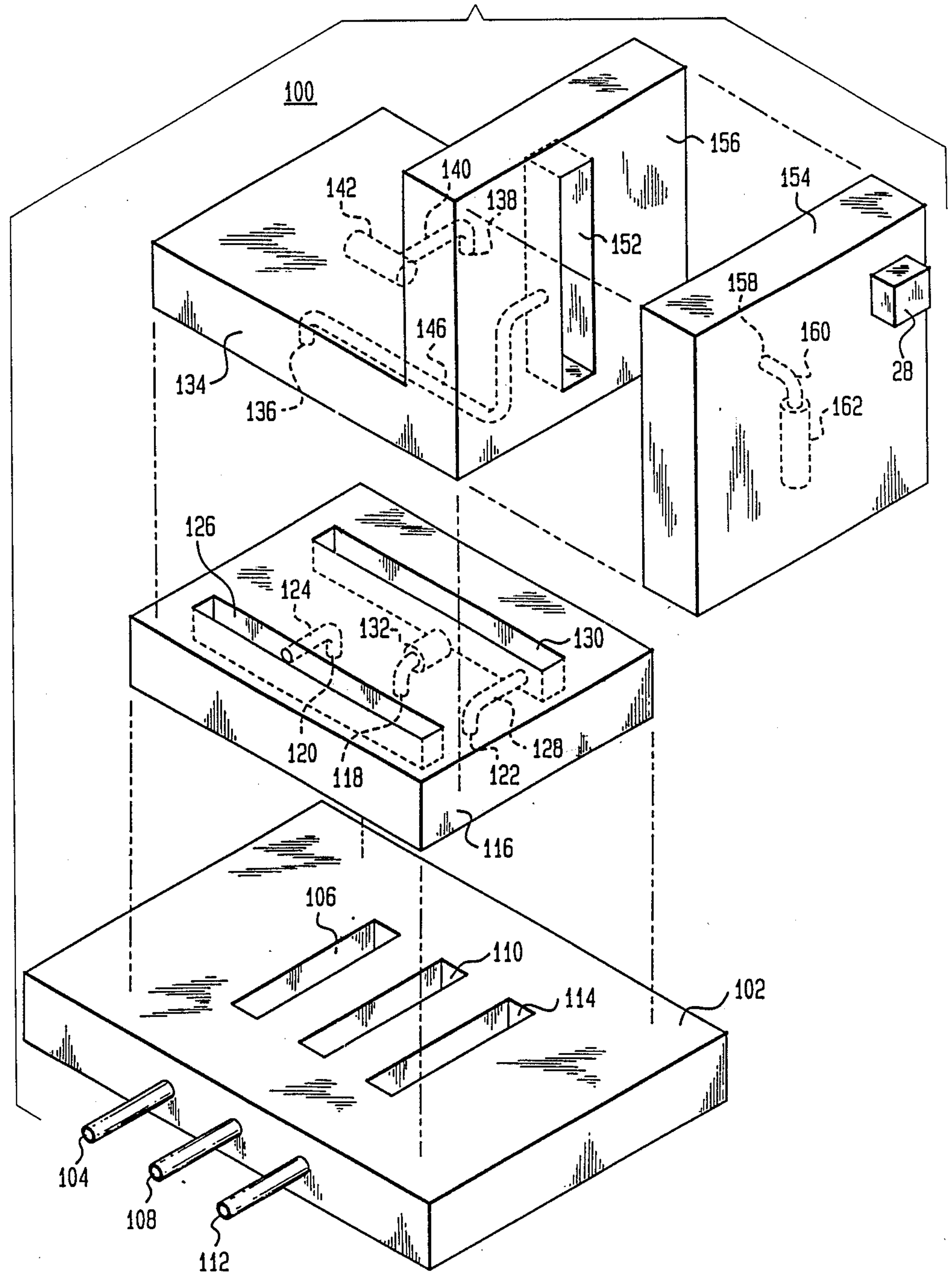
FIG. 3 show a micropositioner for three directions of motion in accordance with another embodiment of the invention.
Figure 4:
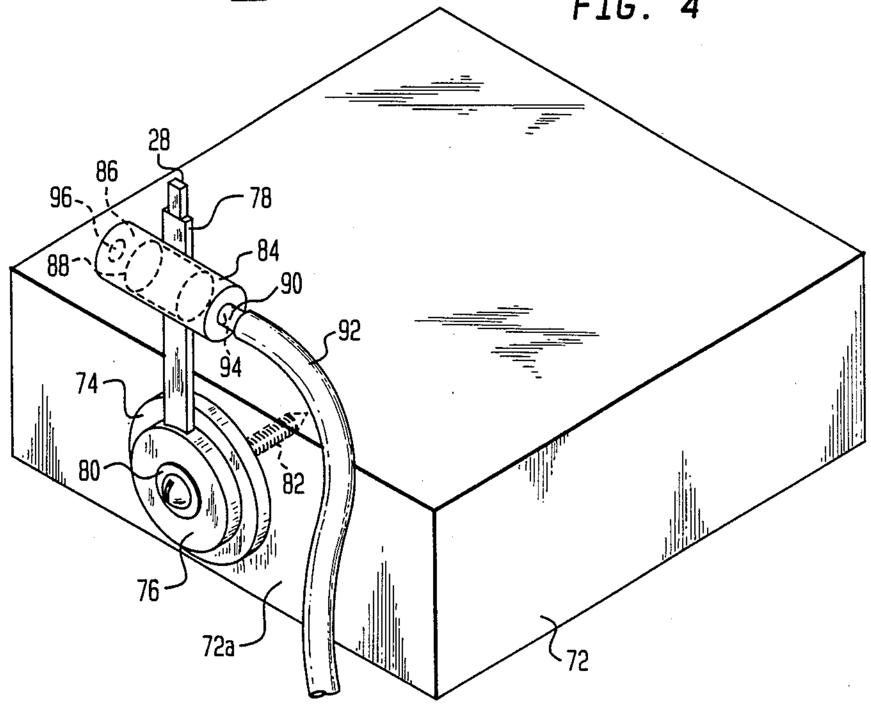
FIG. 4 shows a micropositioner for angular positioning in accordance another embodiment of the invention.

Referring now to FIG. 3, there is shown a micropositioner (positioner) 100 in accordance with another embodiment of this invention which provides for the accurate positioning of an object 28 in three directions. Micropositioner 100 essentially comprises base-plate 102 and upper plates 116, 134 and 154. Base-plate 102 is essentially fixed and upper plates 116, 134 and 154 are moveable such that object 28, shown on an end surface of plate 154, can be positioned in the x, y and z axes. To simplify the drawing, the chambers and impacting pistons with end-plugs corresponding to chamber 54 and impacting piston 56 and end-plug 58 of FIG. 2, are represented in FIG. 4 by just the outlines of the chambers 132, 142 and 162. Filters to prevent dust from entering the chambers would typically be used but are also not shown.

The micropositioner 100 is shown in exploded perspective view for ease of visualization. The fixed baseplate 102 has three slots 106, 110 and 114 cut partway there through in the same way as the single slot 50 of FIG. 2. A tube 104 communicates with slot 106; a tube 108 communicates with slot 110; and a tube 112 communicates with slot 114. When plate 116 is placed on top of plate 102, air entering tube 108 enters slot 110, passes through a hole 118 in plate 116, and drives the impacting piston inside chamber 132. Air in slots 106 and 114 passes through holes 12O and 122, respectively, and is routed into slots 126 and 130 respectively, of plate 116 . When plate 134 is placed atop plate 116, the air in slot 130 can only pass through a hole 138 in plate 134 and thence through a channel 140 of the plate 134 where the air can drive the piston inside chamber 142. The air in slot 126 can only pass through a hole 136 in plate 134 and thence through its associated channel 146 in plate 134 and into slot 152 of plate 156. When plate 154 is placed in contact with an end face 156 of plate 134, the air in slot 152 can only pass through hole 158 in plate 154 and through a channel 160 of plate 154 to drive the piston in chamber 162. Accordingly, air pulses delivered to tube 108 drive the piston in chamber 132 and drive plate 116 in the length direction of slots 106, 110 and 114. Air pulses delivered to tube 112 drive the piston inside chamber 142 and thus drive plate 134 in the length direction of slots 126 and 130. Air pulses delivered to tube 104 enters slot 106, passes through hole 120 into slot 126 and then through hole 136 and channel 146 into slot 152. From slot 152 the air passes through hole 158 and channel 160 and then drives the piston inside cylinder 162 which drives plate 154 in the length direction of slot 152.

It is to be understood that while not shown, each of the moveable plates 116, 134 and 154 may have guides like guides 29 in FIG. 1 to constrain the motion in just one direction. The base and the moveable plates can be machined or cast or molded and can be made of metal, glass ceramic or plastic.

Referring now to FIG. 4, there is shown a micropositioner (positioner) 400 in accordance with another embodiment of this invention which provides for accurate rotary positioning of an object 28 which is attached to an arm 78 of micropositioner 400. Micropositioner 400 functions essentially as micropositioner 10 of FIG. 1 except it provides rotary motion instead of motion in a straight line. Micropositioner 400 comprises a fixed base-plate 72 with a washer 74 fixed to one of its side faces **72*a*, another washer 76 fastened to the arm 78, a screw fastener 82, a spring washer 80, a cylinder 84 defining a chamber 86, an impacting piston 88, a rigid tube 90 and a flexible tube 92. The screw fastener 82, which is set into base-plate 72, holds washer 76 against washer 74 via spring washer 80. Arm 78 can be rotated around the screw 82 as a fulcrum against the friction between washers 74 and 76. The friction can be adjusted by tightening or loosening screw 82. The cylinder 84 defining a chamber 86 having the impacting piston 88 is fixed to arm 78. The tube 90 is rigidly attached to cylinder 84 at one end in a sealing relationship and communicates with chamber 86 through a first orifice 94 in an end of cylinder 84. A second orifice 96 exists on an opposite end of cylinder 84. Air to drive the impacting piston 86 back and forth inside chamber 88 is introduced via tube 90 and flexible tube 92. Stepwise rotational motion is now achieved by the impact of the piston 86 against the ends of the cylinder 84 in a manner essentially identical to the description of the operation of micropositioner 10 of FIG. 1. An object 28 which is to be positioned is shown attached to a top portion of arm 78. Object 28 could be attached to other portions of arm 78**.

The air to drive the piston could of course be introduced into the cylinder via the base-plate through the washers and through a hollow channel in the arm in a manner analogous to that described in conjunction with FIG. 2. In addition, the cylinder 84 could be incorporated inside the arm 78 or washer 76 in a manner analogous to the micropositioner 40 of FIG. 2.

Figure 5:
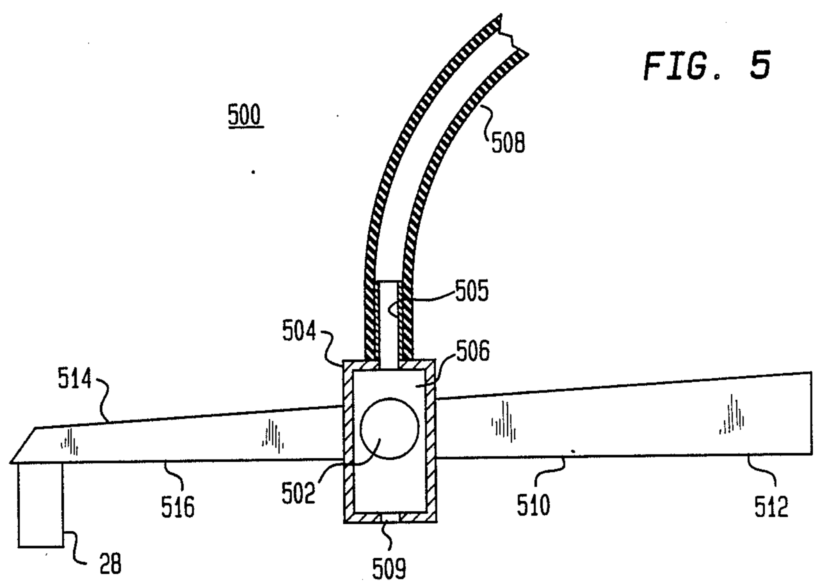
FIG. 5 shows a micropositioner for multiple direction movement in accordance with another embodiment of the invention.

Referring now to FIG. 5, there is shown a cross-sectional view of a micropositioner 500 which can be used to strike an object 28 so as to position it in any desired direction. Micropositioner 500, which is shown and described in a separate U.S. Pat. application Ser. No. 180,457 that is being filed concurrently with the present application and in which the inventors and assignee are common with the present patent application, comprises a small metal ball 502 held captive inside a cylindrical chamber 506 which is defined by a housing 504. A force transmission member 510, typically fabricated from sheet metal and having a pointed end 514 and a handle end 512, is attached to housing 504. A tube (typically flexible) 508 is attached to a protrusion portion 505 of housing 504 and is in communication with chamber 506.

Ball 502 is made to move up and down inside chamber 506 by air forced in and out of the flexible tube 508 which is coupled to chamber 506 through portion 505 of housing 504. Air forced downward through tube 508 drives the ball 502 downward inside the chamber 506 and the air escapes out of an orifice end 509 of housing 504. When the ball 502 strikes an end of the chamber 504 it imparts a sharp mechanical impulse to the housing 504 which is mounted solidly to the member 510. The chamber 506 transmits the mechanical impulse to the member 510. In operation, the sheet metal member 510 is hand-held by the handle end 512 and the pointed end 514 is placed in contact with the object 28 to be moved (positioned). Air forced through tube 508 causes the ball 502 to strike the inside of chamber 506 of housing 504 at the orifice end 509. The mechanical impulse generated is transmitted via member 510 to the pointed end 514 and thence to the object 28 to be moved. A vacuum is then applied to chamber 506 by pulling air out of tube 508 so as to move the ball 502 to the opposite end of chamber 506. Air is again forced into tube 508 and thus into chamber 506 so as to force ball 502 to again strike the orifice end 509 of housing 504. By repeatedly striking an object 28, the object 28 can be moved a desired distance. By striking the object 28 from different directions, the object 28 can be moved in any direction desired.

The simplest method of applying the streams of air required to actuate the micropositioners 10. 40, 100, 400 and 500 of FIG. 1, 2, 3, 4 and 5, respectively, is to employ the force of the operators breath. In this method, the operator simply takes the free end of the flexible tube in his mouth and blows or sucks air through the tube to cause the moveable slug to strike either one or the other end of the cylinder(s) in FIGS. 1, 2, 3, 4 or 5.

Figure 6:
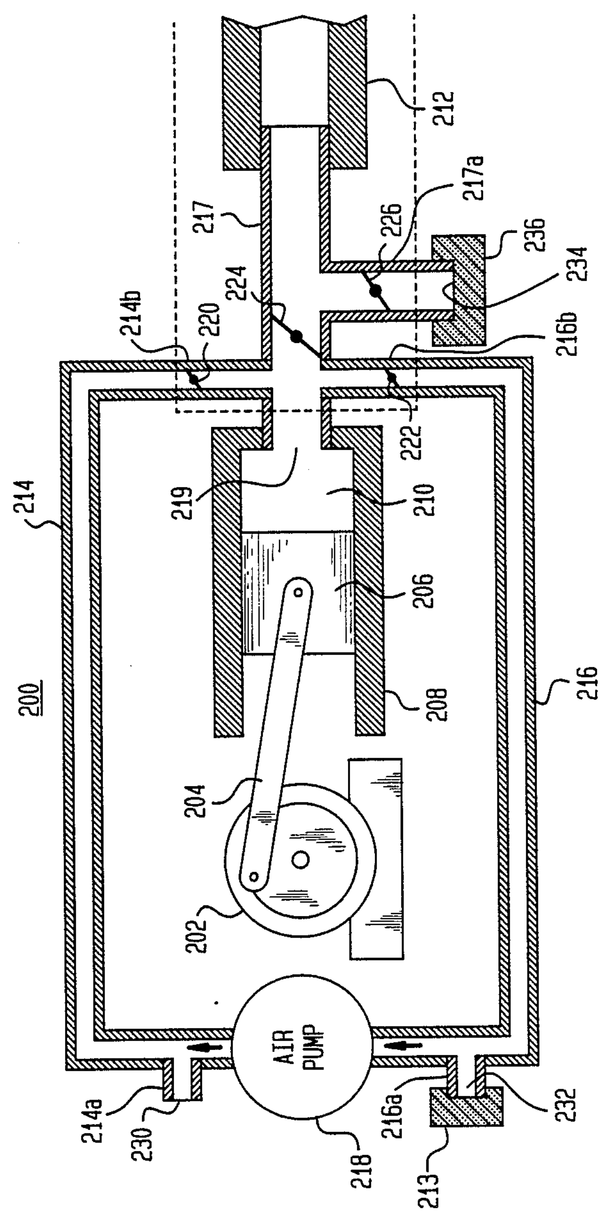
FIG. 6 shows a mechanism for driving air in and out of the micropositioners of FIGS. 1, 2, 3, 4 and 5.

Referring now to FIG. 6, there is shown air pump apparatus 200 in accordance with the present invention. Air pump apparatus 200 is designed to provide the air movement necessary to move the impacting pistons of FIGS. 1, 2, 3, 4 and 5 in a controllable way. Air pump apparatus 200 comprises an air pump 218, a motor 202, a connecting rod 204, a drive piston 206, a cylinder 208 which defines a chamber 210, first, second and third tubes 214, 216 and 217, air control valves 220, 222, 224 and 226, and air filters 213 and 236.

Tube 214 is coupled to an output port of air pump 218 at one end and is coupled to a first opening in tube 217 at a second end. Tube 216 is coupled to an input port of air pump 218 at one end and is coupled to a second opening in tube 217 at a second end. A first end of tube 217 is coupled through an orifice 219 in cylinder 208 and is in communication with chamber 210. A second end of tube 217 is coupled to a tube 212 which can be coupled to the micropositioners 10, 40, 100, 400 or 500 of FIGS. 1, 2, 3, 4 and 5, respectively. Tube 214 has a portion 214*a* which has an end that defines an orifice 230. Tube 216 has a portion 216*a* which has an end that defines an orifice 232 which is covered by air filter 213. Valve 220 is positioned in a portion 214*b* of tube 214. Valve 22 is positioned in a portion 216*b* of tube 216. Tube 217 has a portion 217*a* in which valve 226 is positioned and which defines an orifice 234 which is covered by air filter 236. Motor 202 is connected to drive piston 206 through connecting rod 204.

Motor 202, through connecting rod 204, moves a drive piston 206, back and forth inside cylinder 208. This action forces the air in the chamber 210 in and out of the flexible tubing 212 that is connectable to the micropositioners 10, 40, 100, 400 and 500 of FIGS. 1, 2, 3, 4 or 5, respectively. Air pump 218 drives a continuous flow of air in the direction of the arrows. Air flow control valves 220, 222, 224 and 226 control the air flow delivered to tube 212. With valves 220 and 222 closed, the air pump 218 receives air from an orifice 232 and drives it out of an orifice 230. This results in a decrease in air pressure from atmospheric in tube 216 and an increase in tube 214. The air filter 213 over orifice 232 prevents ambient dust from entering the pump. If now valve 224 is open and valve 226 is closed, air from chamber 210 is forced through tube 212 and drives an impacting piston coupled eventually to tube 212 back and forth inside its respective cylinder. The magnitude of the displacement of drive piston 206 is chosen so that the impacting piston(s) of FIGS. 1, 2, 3 , 4 or 5 oscillate back and forth inside the respective cylinder without striking the respective cylinder ends with significant force. If now valve 220 is opened, air from the pump 218 flows down tube 214 and into tube 217. This adds to the pulses of air that flow into tube 212 and causes an impacting piston coupled to tube 212 to strongly strike one end of its cylinder at each stroke of drive piston 206. Closing valve 220 and opening valve 222 removes air from tube 212 and causes an impacting piston coupled to tube 212 to strike the other end of its cylinder.

Advantageously, valves 220 and 222 can be ganged together with a single control so that as one opens, the other closes. In addition, by varying the ratio of the amount that one of the valves 220 and 222 are open compared with the other, an operator can control the force with which the impacting piston strikes one or the other ends of its cylinder, thus controlling the magnitude of the movement of the micropositioner at each stroke. Partially opening valve 226 allows air to escape or enter tube 212 thus providing an alternate means of controlling the strength of the air movement in tube 212. Closing valve 224 stops all air movement in tube 212. Valve 224 is typically closed by the operator when the positioner has reached the desired placement. The motor 202 can be of the variable speed type so the operator can vary the rapidity of the strokes.

To control more than a single impacting piston, it is only necessary to repeat the mechanisms inside the dashed outline, namely valves 220, 222, 224 226 and tubing 212. The drive motor 202, cylinder 208 and associated mechanisms and the air pump 118 with orifices 230 and 232 can serve a multiplicity of positioners.

Alternatively, a multi-position valve at the juncture between tube 212 and the apparatus of FIG. 6 can be employed to direct the airflow through a multiplicity of tubes 212. In this way, all of the apparatus of FIG. 6 including valves, 220, 222, 224 and 226 could serve a multiplicity of positioners one at a time.

It is to be understood that the embodiments described herein are merely illustrative of the general principles of the invention. Various modifications are possible within the scope of the invention. For example, two cylinders, each containing an impacting piston, can be positioned orthogonally on a single moveable plate to facilitate positioning of the moveable plate in two orthogonal directions. The two orthogonal cylinders could also be formed within a portion of the moveable plate. Still further, two cylinders, each containing an impacting piston, can be positioned parallel to one another but off-center on or in a friction held moveable plate. By actuating the impacting pistons in opposite directions, the plate rotates. Operating the impacting pistons in the same direction causes the plate to translate. Thus, an object (e.g., an electrical probe) mounted on the moveable plate can be positioned to any desired point in two dimensions. If desired, a second friction held member with an impacting piston mounted on the moveable plate as a base could provide movement in a third direction.

In the apparatus described and illustrated herein, the contacting surfaces of the friction held members are generally flat. Other surfaces geometries, such as a ball inside a socket or a round rod in a V-shaped channel, are also possible implementations. More complex mechanisms can also be envisioned. For example, the vibratory movement of the impacting piston could cause the engagement of a clutch or spline to lock together or unlock different parts of complex machinery.

What is claimed is:

1. A micropositioner comprising:

a base;

a positioning member located on and being moveable with respect to the base, the positioning member being normally stationary with respect to the base as a result of frictional coupling between the positioning member and the base;

means comprising a moveable impact member supported on or within the positioning member for imparting incremental movement to the positioning member;

means integral to or fixed to the positioning member for arresting the movement of the impact member; and means for causing the impact member to strike the arresting means with a preselected force, said force being transmitted to the arresting means and to the positioning member to cause both to move in the general direction of the force, the frictional coupling between the positioning member and the base limiting the movement of the positioning member.

2. The micropositioner of claim 1 wherein the impact member is contained within a chamber that is integral to or fixed to the positioning member, the impact member being moveable along the length of the chamber, and the chamber including the arresting means.

3. The micropositioner of claim 1 wherein the impact member is moved by fluid means.

4. The micropositioner of claim 3 wherein the fluid means is a gas.

5. The micropositioner of claim 4 wherein the gas is air.

6. The micropositioner of claim 4 further comprising vacuum means coupled to the base and positioning member for selectively increasing the frictional coupling between the positioning member and the base.

7. The micropositioner of claim 6 wherein-the gas is conducted to the chamber by a passageway formed in the base that communicates with a passageway formed in the positioning member that is connected to the chamber.

8. The micropositioner of claim 3 wherein the fluid means includes a reciprocating pump and ducting and valving that couples the reciprocating pump to a second pump in a manner that enables control of the force imparted by the impact member.

9. The micropositioner of claim 1 wherein the movement of the positioning member is directed by one or more guides associated with the positioning member.

10. The micropositioner of claim 1 wherein the impact member comprises a piston and movement of the piston is effected by forcing a fluid in or out of one end of the chamber.

11. A micropositioner for positioning an object to a desired location comprising:

a base;

a first positioning member located on and being moveable with respect to the base, the first positioning member being normally stationary with respect to the base as a result of frictional coupling between the first positioning member and the base;

first means comprising a first moveable impact member supported on or within the first positioning member for imparting incremental movement to the first positioning member;

second means integral to or fixed to the first positioning member for arresting the movement of the first impact member;

third means for causing the first impact member to strike the second means with a preselected first force, said first force being transmitted to the second means and to the first positioning member to cause both to move in the general direction of the first force, the frictional coupling between the first positioning member and the base limiting the movement of the first positioning member;

a second positioning member located on and being moveable with respect to the first positioning member, the second positioning member being normally stationary with respect to the first positioning member as a result of frictional coupling between the first and second positioning members;

fourth means comprising a second moveable impact member supported on or within the second positioning member for imparting incremental movement to the second positioning member;

fifth means integral to or fixed to the second positioning member for arresting the movement of the second impact member;

sixth means for causing the second impact member to strike the fifth arresting means with a preselected second force, said second force being transmitted to the fifth arresting means and to the second positioning member to cause both to move in the general direction of the second force, the frictional coupling between the first and second positioning members limiting the movement of the second positioning member;

a third positioning member located on and being moveable with respect to the second positioning member, the third positioning member being normally stationary with respect to the second positioning member as a result of frictional coupling between the second and third positioning members;

seventh means comprising a third moveable impact member supported on or within the third positioning member for imparting incremental movement to the third positioning member;

eight means integral to or fixed to the third positioning member for arresting the movement of the third impact member; and ninth means for causing the third impact member to strike the eighth means with a preselected ninth force, said third force being transmitted to the eighth means and to the third positioning member to cause both to move in the general direction of the third force, the frictional coupling between the second and third positioning members limiting the movement of the third positioning member; and the direction of the first, second and third forces each being a separate one of the x, y, and z axes such that the object, when coupled to a portion of the third positioning member, can be positioned to a desired location.

12. A micropositioner comprising:

a base;

a positioning member located on and being moveable with respect to the base, the positioning member being normally stationary with respect to the base as a result of frictional coupling between the positioning member and the base;

a positioning tool at least selectively in mechanical contact with the positioning member and comprising a moveable impact member supported on or within the positioning tool for imparting incremental movement to the positioning tool;

arresting means integral to or fixed to the positioning tool for arresting movement of the impact member; and means for causing the impact member to strike the arresting means with a preselected force, said force being transmitted means with a preselected force, said force being transmitted via the arresting means to the positioning tool and to the positioning member to cause both to move in the general direction of the force, the frictional coupling between the positioning member and the base limiting movement of the positioning member.

13. A micropositioner comprising:

a base;

a positioning member being adapted to hold an object whose location is to be selectively set and being located on and being moveable with respect to the base, the positioning member being normally stationary with respect to the base as a result of frictional coupling between the positioning member and the base;

a chamber having first and second ends and being attached to or being an integral portion of the positioning member;

a moveable impact member located within the chamber;

means for causing the impact member to strike one of the ends of the chamber with a preselected force, said force being transmitted to the chamber and to the positioning member to cause both to move in a general direction of the force such that the object is moved to a desired location with the frictional coupling between the positioning member and the base limiting movement of the positioning member.

14. The micropositioner of claim 13 wherein the impact member is moved by fluid means.

15. The micropositioner means of claim 14 wherein the fluid means is a gas.

16. The micropositioner means of claim 15 wherein the gas is air.

17. The micropositioner of claim 20 wherein the fluid means includes a reciprocating pump and ducting and valving that couples the reciprocating pump to a second pump in a manner that enables control of the force imparted by the impact member.

18. The micropositioner of claim 13 wherein the movement of the positioning member is directed by one or more guides associated with the positioning member.

19. A micropositioner comprising:

a base;

a positioning member having a first portion which is supportable by and in frictional contact with the base and having a second portion which is adapted to be placed in contact with an object to be positioned;

means comprising a moveable impact member supported on or within the positioning member for imparting incremental movement to the positioning member;

means integral to or fixed to the positioning member for arresting the movement of the impact member; and means for causing the impact member to strike the arresting means with a particular force, said force being transmitted to the arresting means and to the positioning member to cause the arresting means and the second portion of the positioning member to move in the general direction of the force such that the object being contacted is moved to a desired location.

20. The micropositioner of claim 14 wherein the impact member is contained within a chamber that is integral to or fixed to the positioning member, the impact member being moveable along the length of the chamber, and the chamber including the arresting means.

21. A micropositioner of claim 14 wherein the impact member comprises a piston and movement of the piston is effected by forcing a fluid in or out of one end of the chamber.

* * * * *